United States Patent Office 3,106,588
Patented Oct. 8, 1963

3,106,588
PROCESS FOR SYNTHESIZING CHLOROPICRIN
John M. Wilhelm, 6322 Tompkins Way,
Culver City, Calif.
No Drawing. Filed Jan. 3, 1961, Ser. No. 79,994
10 Claims. (Cl. 260—644)

This invention relates to a new and improved process for synthesizing chloropicrin by the chlorination of nitromethane.

Other processes for the formation of chloropicrin require an excess of sodium hypochlorite or other alkaline hypochlorite. Some processes pass chlorine gas into a solution containing a base to produce hypochlorite for the reaction with nitromethane.

My process utilizes a slight excess of nitromethane along with an alkaline hypochlorite to obtain relatively high yields and high purity of chloropicrin.

It is, therefore, an object of my invention to provide a process of synthesizing chloropicrin from nitromethane without using an excess of hypochlorite in the reaction.

Another object of my invention is to provide a process for the synthesis of chloropicrin which utilizes a slight excess of nitromethane and produces relatively high yields and high purity of chloropicrin.

These and other objects will be more readily understood from the following discussion.

My process preferably employs a solution of sodium hypochlorite as the chlorinating agent, although other alkaline hypochlorites are also suitable. I have found that it is not necessary to keep the hypochlorite in excess to obtain relatively high yields of chloropicrin. The reaction between nitromethane and hypochlorite is sufficiently rapid so that there is little chance for the sodium hydroxide which is formed during the reaction to react further with the nitromethane in any appreciable amount.

Further, I have discovered that a slight excess of nitromethane over the theoretical amount necessary to completely react wtih a given amount of hypochlorite is instrumental in producing high yields of chloropicrin in high purity. The excess nitromethane serves to replace any nitromethane otherwise reacting with the sodium hydroxide formed by the main reaction.

The theoretical amount is the amount of nitromethane which completely reacts with a given amount of hypochlorite and where all three hydrogen atoms on the carbon atom next to the nitrogen atom are replaced by chlorine atoms, thereby forming chloropicrin. I define a slight excess of nitromethane over the theoretical amount as being any amount between the theoretical amount and up to 10 percent over the theoretical amount.

The following examples are by way of illustration of the results obtained using varying amounts of excess nitromethane in my process thereby obtaining high yields of chloropicrin.

Example 1

To 500 gallons of 16% sodium hypochlorite by weight was added 550 gallons of water. To the resulting mixture was added 25 gallons of 61% nitromethane by volume over a period of 8 minutes with agitation. The amount of nitromethane was 2% in excess of the theoretical amount. The yield of chloropicrin was 43.5 gallons, or 94.5% of the theoretical amount possible.

Example 2

To 540 gallons of 16% sodium hypochlorite by weight was added 500 gallons of water. Then 45 gallons of 61% nitromethane by volume was added over a period of 25 minutes with agitation. The amount of nitromethane was 4% in excess of the theoretical amount. The yield of chloropicrin was 45 gallons, or 90% of the theoretical amount possible.

Example 3

To 335 parts by weight of water were added 94 parts by weight of sodium hydroxide and 80 parts by weight chlorine. To the sodium hypochlorite solution thus formed were added 600 parts by weight of water and 24.2 parts by weight of nitromethane. The amount of nitromethane was 5% in excess of the theoretical amount. The yield of chloropicrin was 58.3 parts by weight, or 95% of the theoretical amount possible.

Example 4

To 40 parts by weight of water were added 10.5 parts by weight of sodium hydroxide and 9.0 parts by weight chlorine. To the sodium hypochlorite solution thus formed was added 70 parts by weight of water and 2.76 parts by weight of nitromethane. The amount of nitromethane was 7% in excess of the theoretical amount. The yield of chloropicrin was 6.53 parts by weight, or 94% of the theoretical amount possible.

Example 5

To 112 parts by weight of water were added 29 parts by weight of sodium hydroxide and 25 parts by weight of chlorine. To the sodium hypochlorite solution thus formed was added 195 parts by weight of water and 7.9 parts by weight of nitromethane. The amount of nitromethane was 8% in excess of the theoretical amount. The yield of chloropicrin was 18.4 parts by weight, or 95% of the theoretical amount possible.

While several examples have been described in detail, it is understood that the scope of the invention is not to be limited thereby but numerous variations are possible without departing from the spirit and scope of the invention as claimed hereinafter.

I claim:

1. A process for the production of chloropicrin which comprises adding rapidly over a period ranging from 8 to 25 minutes a slight excess of nitromethane to an aqueous solution of sodium hypochlorite in the absence of cooling.

2. A process for synthesizing chloropicrin comprising adding rapidly over a period ranging from 8 to 25 minutes a slight excess of nitromethane to an aqueous solution of sodium hypochlorite with agitation over a period of time in the absence of cooling.

3. A process for the production of chloropicrin which comprises adding rapidly over a period ranging from 8 to 25 minutes a slight excess of nitromethane to an aqueous solution of an alkaline hypochlorite in the absence of cooling.

4. A process for synthesizing chloropicrin comprising adding rapidly over a period ranging from 8 to 25 minutes a slight excess of nitromethane to an aqueous solution of 4 to 10 percent sodium hypochlorite by weight with agitation over a period of time in the absence of cooling.

5. A process for synthesizing chloropicrin comprising adding rapidly over a period ranging from 8 to 25 minutes an amount of nitromethane which is between the theoretical amount and up to 10 percent in excess of the theoretical amount necessary to completely react with the sodium hypochlorite, to an aqueous solution of 4 to 10 percent sodium hypochlorite by weight with agitation over a period of time in the absence of cooling.

6. A process for synthesizing chloropicrin comprising adding rapidly over a period ranging from 8 to 25 minutes a slight excess of nitromethane to an aqueous solution of 4 to 10 percent sodium hypochlorite by weight with agitation in the absence of cooling.

7. The process according to claim 6 in which the slight excess of nitromethane is 2% of the theoretical amount in the absence of cooling.

8. The process according to claim 6 in which the slight excess of nitromethane is 8% of the theoretical amount in the absence of cooling.

9. The process according to claim 6 in which the slight excess of nitromethane is 5% of the theoretical amount in the absence of cooling.

10. The process according to claim 6 in which the slight excess of nitromethane is 7% of the theoretical amount in the absence of cooling.

References Cited in the file of this patent
UNITED STATES PATENTS 2,365,981   Tindall _____ Dec. 26, 1944